United States Patent
Yopp

(10) Patent No.: US 8,788,176 B1
(45) Date of Patent: Jul. 22, 2014

(54) ADJUSTABLE THRESHOLD FOR FORWARD COLLISION WARNING SYSTEM

(71) Applicant: Ford Global Technologies, LLC, Dearborn, MI (US)

(72) Inventor: Wilford Trent Yopp, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/921,498

(22) Filed: Jun. 19, 2013

(51) Int. Cl.
*B60W 30/08* (2012.01)
*B60W 30/095* (2012.01)
*G08G 1/16* (2006.01)
*B60W 30/09* (2012.01)
*B60W 30/10* (2006.01)

(52) U.S. Cl.
CPC ............ *B60W 30/095* (2013.01); *G08G 1/166* (2013.01); *B60W 30/09* (2013.01); *B60W 30/10* (2013.01); *G08G 1/16* (2013.01)
USPC .............. 701/96; 701/300; 701/301; 701/302

(58) Field of Classification Search
CPC .......... G08G 1/16–1/163; B60W 30/08–30/17
See application file for complete search history.

(56) References Cited

U.S. PATENT DOCUMENTS

| | | | |
|---|---|---|---|
| 6,879,249 B2 * | 4/2005 | Takahashi | 340/435 |
| 7,609,150 B2 | 10/2009 | Wheatley et al. | |
| 8,352,173 B2 * | 1/2013 | Greene et al. | 701/301 |
| 8,463,500 B2 * | 6/2013 | Cuddihy et al. | 701/45 |
| 2003/0149530 A1 * | 8/2003 | Stopczynski | 701/301 |
| 2004/0181338 A1 * | 9/2004 | Dobler et al. | 701/301 |
| 2005/0259033 A1 | 11/2005 | Levine | |
| 2008/0042813 A1 * | 2/2008 | Wheatley et al. | 340/435 |
| 2008/0042814 A1 * | 2/2008 | Hurwitz et al. | 340/435 |
| 2010/0070148 A1 * | 3/2010 | Solyom et al. | 701/70 |
| 2011/0035150 A1 * | 2/2011 | Sundarraj et al. | 701/301 |
| 2011/0178710 A1 * | 7/2011 | Pilutti et al. | 701/301 |
| 2012/0146809 A1 | 6/2012 | Oh et al. | |
| 2013/0179047 A1 * | 7/2013 | Miller et al. | 701/70 |

\* cited by examiner

*Primary Examiner* — Jonathan M Dager
(74) *Attorney, Agent, or Firm* — Frank A. MacKenzie

(57) ABSTRACT

A driver assistance system for a motor vehicle monitors approaching objects around the vehicle in order to take a driver assistance action in response to a predicted impact with an approaching object according to a time-to-impact threshold. the time-to-impact threshold includes a nominal or default value that is adjusted according to several different measures of vehicle and driving conditions. Respective offsets determined by a load monitor, a braking monitor, and a steering monitor are added to the threshold in response to measured vehicle performance parameters being different from expected values. The driver assistance action may be a perceptible warning for a forward collision warning system, a speed reduction in an adaptive cruise control system, or a braking action in a brake-steer system.

18 Claims, 4 Drawing Sheets

US 8,788,176 B1

ADJUSTABLE THRESHOLD FOR FORWARD COLLISION WARNING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to collision warning and avoidance systems for motor vehicles, and, more specifically, to an adjustable threshold for initiating driver assistance actions in response to predicted collisions.

Several different types of driver assistance systems have been developed that involve the remote sensing and tracking of other vehicles or objects that may approach or impact a host vehicle. Scanning radar systems, camera-based optical based recognition systems, or combinations of the two are typically used to find relevant objects, determine their relative speed and travel path, and predict whether and when an impact may take place if the vehicles remain on their current trajectories. The driver assistance system may simply warn a driver as in a forward collision warning (FCW) system, thereby allowing the driver to determine and execute any necessary evasive maneuver. Other types of driver assistance systems such as an adaptive cruise control (ACC) system may automatically initiate an evasive action wherein a set cruising speed is reduced when a lead vehicle is detected, or such as a brake-steer system which may apply unequal braking forces to different wheels in order to steer the host vehicle away from a potential collision.

Initiation of the driver assistance action (whether it is the issuance of a warning or an automatic intervention to avoid a predicted impact) may or may not be trigger depending on how imminent a potential impact actually is. In a typical FCW system, a time-to-impact threshold has been used in order to decide whether a potential impact is sufficiently imminent to justify a warning. The threshold is based on the current host vehicle speed and the relative closing velocity of the target on the collision course. The threshold is typically defined in terms of the estimated amount of time that would elapse until the predicted impact. The amount of time for the threshold may typically be longer when the host vehicle travels at higher speeds. Using the predetermined time threshold and the relative closing velocity of the target, a warning alert is generated when the target approaches the host vehicle within a distance equal to the relative velocity divided by the threshold.

The length of the time-to-impact threshold is generally determined by a vehicle manufacturer in advance such that it provides sufficient opportunity for the driver to take any necessary evasive action, while at the same time ensuring that unnecessary warnings are not generated. The selection of a time-to-impact threshold depends on various parameters and driving conditions which assume certain nominal performance characteristics of the host vehicle such as braking and steering performance, vehicle weight, and others. The threshold settings also are based on assumptions regarding typical road conditions, weather, and other environmental variables. The resulting thresholds typically provide good overall performance for most situations. However, vehicle parameters change with aging of a vehicle, and weather or roadway conditions may frequently change in ways that have an effect on the time it takes to effectively execute an avoidance maneuver. For instance, variable road surface conditions resulting from precipitation, temperature, a rough surface, or sand or gravel coating the road can increase the time required in order to slow down or steer a vehicle. Various factors such as tire wear can also affect surface friction and the ability to generate a torque needed to slow or steer the vehicle. Thus, a situation in which a two second time-to-impact threshold would be appropriate under normal conditions may be insufficient when experiencing particularly unfavorable conditions. It would be desirable to increase the time-to-impact threshold to better match the actual conditions influencing the maneuverability of the host vehicle.

SUMMARY OF THE INVENTION

In one aspect of the invention, apparatus for a vehicle is provided that includes a driver assistance system monitoring approaching objects around the vehicle and configured to take a driver assistance action in response to a predicted impact with an approaching object according to a time-to-impact threshold. A load monitor detects whether a trailer is being towed by the vehicle and determines a first offset in response to a result of the detection, wherein the first offset is substantially equal to zero if no trailer is detected. A braking monitor detects a braking intensity and a resulting change related to vehicle speed, determines an expected change in vehicle speed in response to the braking intensity, and selects a second offset in response to a braking difference between the resulting speed change to the expected speed change, wherein the second offset is substantially equal to zero if the braking difference is below a braking threshold. A steering monitor detects a steering angle of the vehicle and a resulting change related to vehicle yaw, determines an expected change in vehicle yaw in response to the steering angle, and selects a third offset in response to a steering difference between the resulting yaw change to the expected yaw change, wherein the third offset is substantially equal to zero if the steering difference is below a steering threshold. An updater determines a magnitude of the time-to-impact threshold in response to the first, second, and third offsets.

DETAILED DESCRIPTION OF PREFERRED EMBODIMENTS

The present invention estimates current driving conditions using systems and sensors typically already present in a vehicle. The examined parameters include vehicle loading (e.g., number of passengers, cargo, towing of a trailer, etc.) and vehicle-road interactions (e.g., frictional changes results from tire wear, brake wear, rough road, and surface debris). Information gathered on these parameters is used to determine whether default settings such as the time-to-impact threshold should be modified in the driver assistance system (e.g., forward collision warning system, adaptive cruise control, or brake-steer system).

Figure 1:
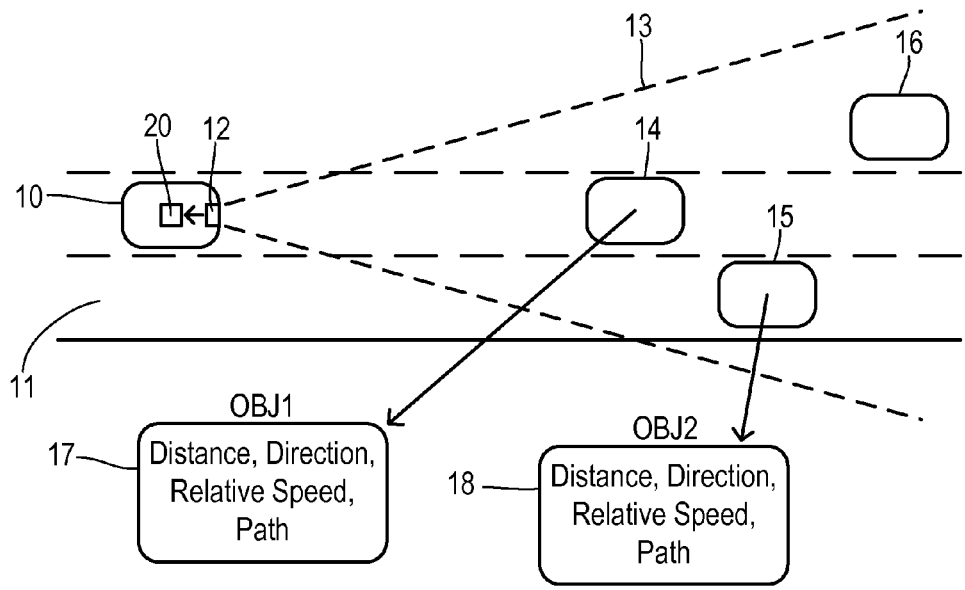
FIG. 1 shows a host vehicle that is tracking several nearby target vehicles.

Referring now to FIG. 1, a host vehicle 10 traveling on a multi-lane roadway 11 is equipped with a remote vehicle sensing and tracking system 12. Within a field of view 13, tracking system 12 is monitoring target vehicles 14, 15, and 16. For each tracked object a set of parameters characterizing the type and behavior of each object is determined and made available for use by other systems. For example, a parameter set 17 is generated for target vehicle 14 and a parameter set 18 is generated for target vehicle 15, wherein each may be comprised an object's distance, direction, relative speed, absolute speed, travel path, etc.

Vehicle 10 further includes a driver assistance system (DAS) 20 which receives parameter sets 17 and 18 in an object list received from a tracking system 12. Depending upon the specific purpose of driver assistance system 20, different driver assistance actions may be taken according to the proximity of any relative approaching target vehicles. Assistance system 20 may examine parameters such as a target vehicle distance, direction, relative speed, and/or travel path as received from tracking system 12 in order to identify whether each tracked vehicle is on a collision course and, if so, then the estimated time until impact. Assistance system 20 may establish an intrusion zone for determining when a driver assistance action should be taken in response to a relative approaching object on a collision course.

Figure 2:
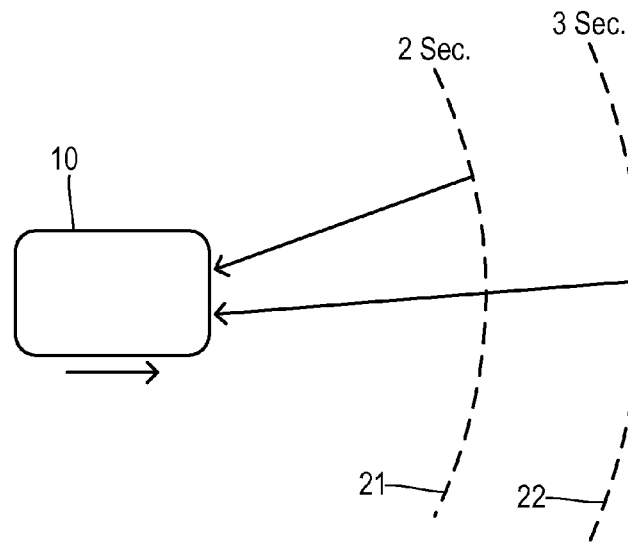
FIG. 2 shows a variable intrusion zone around a host vehicle resulting from a variable time-to-impact threshold.

As shown in FIG. 2, the intrusion zone may be defined in terms of a time-to-impact threshold established as an amount of time reflecting a driver or control system reaction time and other representative performance factors. A time-to-impact threshold 21 having a value of 2 seconds creates a smaller intrusion zone than a time-to-impact threshold 22 with a value of 3 seconds. The actual size of an intrusion zone depends on the relative approaching speed of the target object on a collision course. In conventional driver assistance systems, however, values for the time-to-impact threshold have been based on a fixed set of driving conditions such as vehicle loading and vehicle-road interactions even though these conditions do not remain static.

Figures 3, 5, 6:
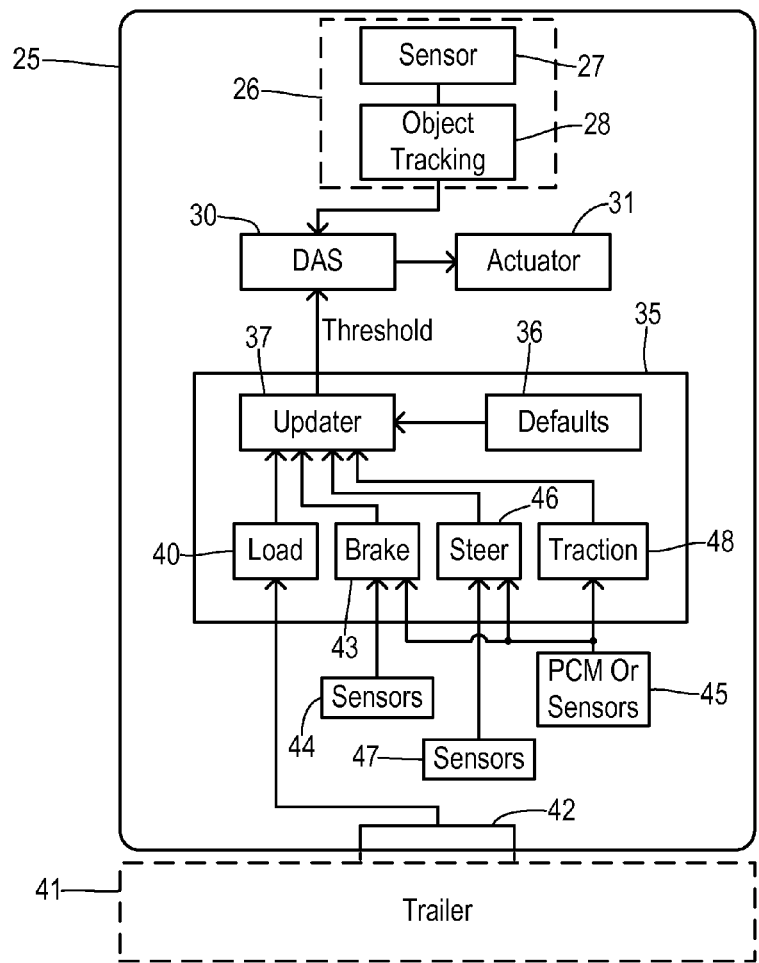
FIG. 3 is a block diagram showing one preferred embodiment of a vehicle according to the present invention.
FIG. 5 shows a lookup table for determining an offset based on a trailer class that may be creating a load for the host vehicle.
FIG. 6 shows a lookup table for determining an expected deceleration assuming nominal driving conditions according to various combinations of braking intensity and host vehicle speed.

Vehicle apparatus for dynamically updating a time-to-impact threshold is shown in FIG. 3. A vehicle 25 includes a remote object detection and tracking system 26 which includes a sensor 27 (such as an electronic scanning radar) and an object tracking controller 28. Tracked objects are reported to a driver assistance system 30 which monitors the objects and can take a driver assistance action using an actuator 31.

In one embodiment, DAS system 30 may be comprised of a forward collision warning (FCW) system wherein actuator 31 comprises a perceptible warning generator such as an audio speaker generating warning tones or a visual display element for generating a flashing light or message. The perceptible warning signal alerts the driver of the predicted impact so that the driver can take evasive action. DAS 30 may alternatively be comprised of an adaptive cruise control (ACC) system wherein driver assistance action taken by actuator 31 could include a reduction in a commanded speed being set by the ACC system to prevent impact with a target vehicle being encountered in the host vehicle's lane. The ACC system may also generate a perceptible warning signal if desired. In yet another embodiment, DAS system 30 can include a brake-steer system wherein the driver assistance action includes the application of a braking force in an unbalanced manner at the individual wheels in order to steer the vehicle so as to avoid the predicted impact.

Each different type of driver assistance system may generally employ intrusion zones of different extents corresponding to their different types of functions being performed. In each case, however, the particular thresholds have not previously taken into account the variability in driving conditions that may negatively influence maneuverability to change the host vehicle's speed or direction to avoid the potential impact. Therefore, vehicle 25 employs an update module 35 for monitoring various aspects of the driving conditions and updating the time-to-impact threshold used by DAS 30. In the illustrated embodiment, conventionally defined time-to-impact threshold values include default values stored in a default memory block 36. The default values are provided to an updater block 37 which receives various offsets (i.e., increments) as described below which are added to the default value and provided to DAS 30 as the adjusted threshold. Each of the separate aspects of the driving conditions described below represent a worsening or deterioration of vehicle maneuverability. Thus, each one provides an incremental offset to be added to the default threshold to increase the magnitude of the threshold time and thereby increase the corresponding intrusion zone (the violation of which triggers the driver assistance action). In a like manner, these additions are revised or removed as vehicle conditions (e.g., replacement of worn tires) or driving conditions change.

A first aspect of the driving conditions is the vehicle loading (i.e., mass being carried by the vehicle). A load monitor 40 can evaluate various aspects of the load including whether or not vehicle 25 is presently towing a trailer 41. Detection may be achieved by monitoring the state of a trailer connection 42. Thus, if trailer 41 is present, an electrical continuity within connector 42 can be inspected to determine the presence of trailer 41. In addition, load monitor 40 may determine a class or size of the connected trailer in various ways, such as through an identification of the type of connector that is present (e.g., a four-pin connector for a small trailer or a seven-pin connector used by larger trailers). If no trailer is detected then an offset provided by load monitor 40 to updater 37 is substantially equal to zero.

Update module 35 further includes a braking monitor 43 which monitors braking performance in a manner that reveals any deterioration from the nominal braking performance that is the basis for the default values. Braking monitor 43 determines a braking intensity using one or more sensors 44 such as a brake pedal sensor for indicating the magnitude of brake pedal movement. Braking monitor 43 further detects a change related to vehicle speed that results from the braking event with the detected braking intensity. Braking monitor 43 may be coupled to a powertrain control module (PCM) 45 in order to determine any desired parameters related to vehicle speed. The speed related change may be a deceleration value, an actual speed drop, or a distance traveled during a particular unit of time, for example. Braking monitor 43 further determines an expected change in the vehicle speed related parameter that would occur under the nominal driving conditions. Braking monitor 43 determines a difference between the actual and expected speed related changes and selects a threshold offset (i.e., increment) in response to the difference. Preferably, if the braking difference is below a predetermined braking difference threshold, then the offset is substantially equal to zero. At larger differences, a larger offset is added to the time-to-impact threshold according to a monotonically increasing function stored by braking monitor 43.

Update module 35 further includes a steering monitor 46 which is responsive to any driving conditions that negatively impact the ability of the host vehicle to steer away from a potential impact. Steering monitor 46 detects a steering angle of the vehicle via a connection to one or more sensors 47 such as a steering wheel angle sensor. Steering monitor 46 further determines a resulting change related to vehicle yaw (i.e., lateral acceleration resulting from a steering angle which should laterally deflect the vehicle). Steering monitor 46 also determines an expected change in vehicle yaw according to the detected steering angle and other parameters such as current vehicle speed. Yaw signals may be obtained from PCM 45 or directly from a yaw sensor included in sensors 47. Steering monitor 46 selects an offset in response to a difference between the measured yaw change and the expected yaw change. If the steering difference below a steering threshold, then the offset is substantially equal to zero. At differences above the steering threshold, a monotonically increasing offset is provided to updater 37.

Update module 35 further includes a traction monitor 48 coupled to PCM 45 and/or additional sensors for determining wheel speeds at at least one driven-wheel and at least one undriven-wheel. Traction monitor 48 detects a disparity between the driven-wheel speed and the undriven-wheel speed. It also determines a torque being applied to the driven wheel in order to determine an expected disparity in response to the torque. The applied torque is preferably available from PCM 45. Traction monitor 48 selects an offset in response to the difference between the detected wheel speed disparity and the expected disparity. If the difference is below a traction threshold, then the offset is substantially equal to zero. Above the threshold, a monotonically increasing offset is generated and provided to updater 37.

In a preferred embodiment, updater 37 generates a sum of a nominal threshold value determined from default block 36 plus the offsets received from load monitor 40, braking monitor 43, steering monitor 46, and traction monitor 48. Alternatively, updater 37 could directly receive the differences between actual performance and expected performance from each monitor and use them to identify an appropriate time-to-impact threshold from a model that incorporates the default values.

Figure 4:
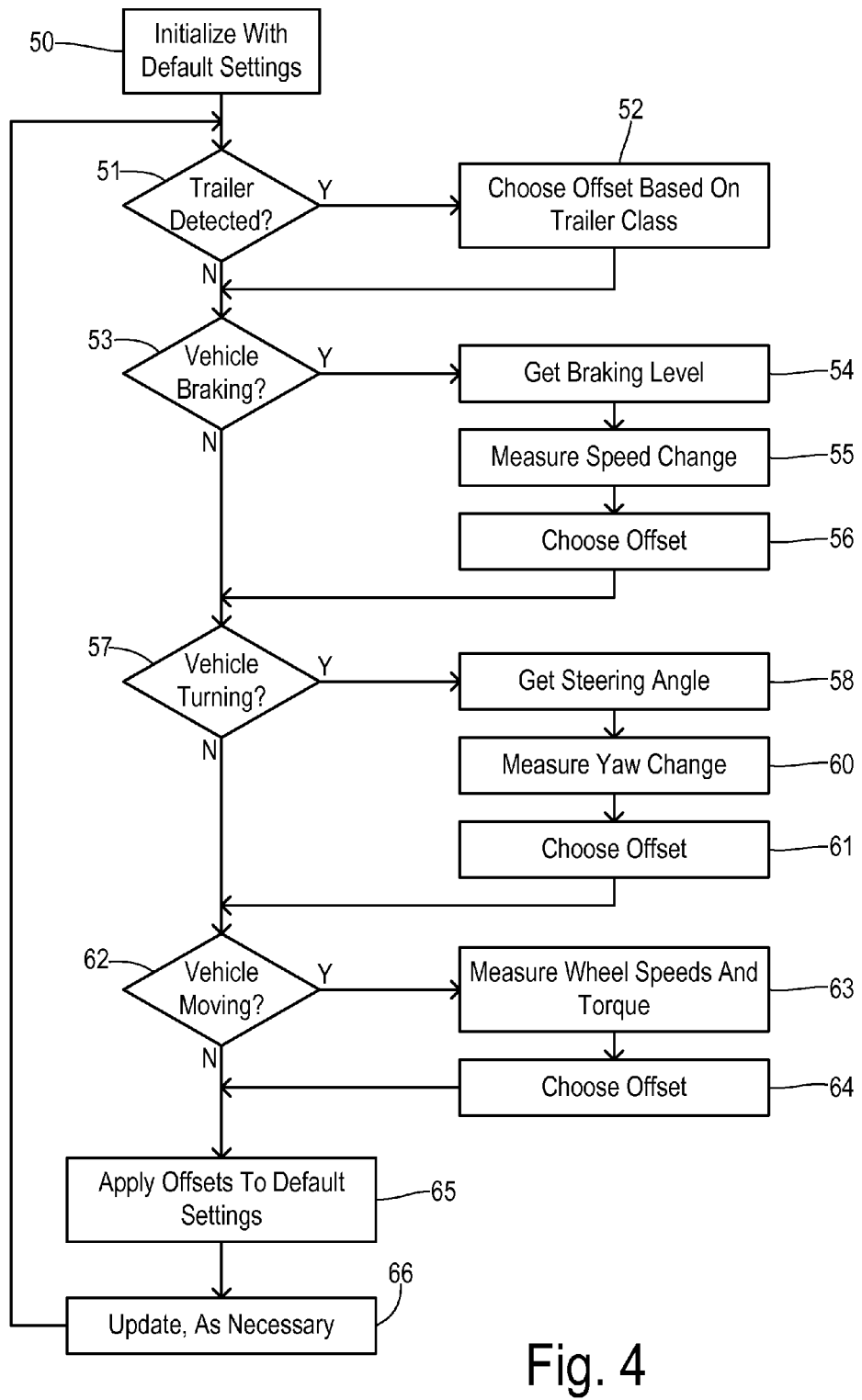
FIG. 4 is a flowchart showing one preferred method of the invention.

A preferred method of the invention is shown in FIG. 4. A threshold update routine is initialized with the default settings for the time-to-impact threshold in step 50. Thereafter, the process runs periodically to adapt the threshold to changing conditions during driving of the vehicle. In step 51, a check is performed to determine whether a trailer is detected. If so, then an offset is chosen based on the trailer class in step 52. If no unusual load conditions exist (i.e., no trailer is detected), then the method proceeds to the next aspect of the driving conditions. Thus, a check is performed in step 53 to determine whether the vehicle is braking. If the vehicle is not braking during the time of the current process, then the next aspect is inspected in step 57. While the vehicle is braking, a braking level or intensity is obtained in step 54 and the resulting speed change is measured in step 55. In step 56, the braking intensity is used to determine an expected speed change and the difference between the measured and expected speed change is used to choose an offset for increasing the time-to-impact threshold.

Step 57 checks whether the vehicle is currently turning. If so, then the steering angle is obtained in step 58 and a resulting yaw change is measured in step 60. In step 61, an expected yaw change for nominal driving conditions is determined based on the steering angle and other parameters such as vehicle speed, and the difference between the measured and expected yaw changes is used to choose an offset. A check is performed in step 62 to determine whether the vehicle is moving (i.e., is being driven as a result of torque applied to the wheels). If so, then individual wheel speeds are measured in step 63 and the applied torque is obtained. Based on the expected differences between driven and undriven wheel speeds at the applied torque, a value is chosen for the offset in step 64.

In step 65, each of the offsets obtained from the various monitors are applied to the default settings. If the resulting magnitude of the time-to-impact threshold has changed from the value already being used, then the driver assistance system is updated as necessary in step 66.

FIG. 5 illustrates a table that may be stored within a load monitor for correlating a detected trailer connector with a corresponding magnitude for the respective offset. Thus, a small trailer having a four-pin connector results in an offset of $i_1$ seconds while a larger seven-pin class trailer produces an offset of $i_2$ seconds.

Figure 7:
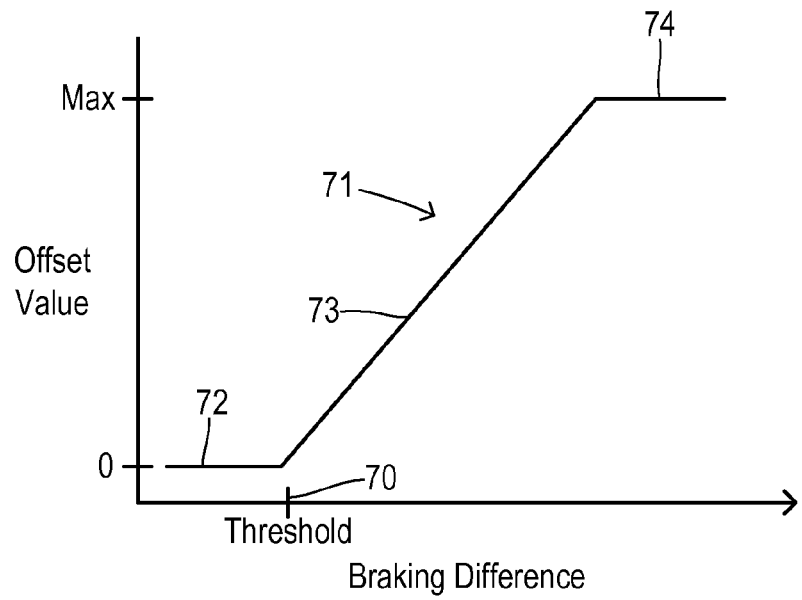
FIG. 7 shows a relationship between a threshold offset and a difference between an actual deceleration and an expected deceleration.

FIG. 6 shows a table stored in the braking monitor that may be used to determine an expected speed related change. Thus, rows of the table represent respective ranges of a braking intensity or level (as a percentage of full braking). Table columns represent respective ranges $R_1$-$R_4$ in the initial vehicle speed. The table cells contain respective values $D_1$ through $D_{16}$ for the expected deceleration or drop in speed. These values may be calibrated in advance by the vehicle manufacturer by measuring the drops in speed or deceleration resulting under nominal conditions when particular brake intensities are applied at the predetermined ranges of initial speed. After taking a difference between the expected deceleration from a particular cell and the measured deceleration, the difference is used to obtain an offset value using a transfer function as shown in FIG. 7. Up to a braking threshold 70, a transfer function 71 may have a value of zero along a segment 72. As the braking difference increases, the offset value increases along a segment 73 until a maximum is reached at a segment 74. The slope and/or shape of transfer function 71 is vehicle specific and may vary according to various parameters of a vehicle's design, but is preferably monotonically increasing between the zero value and the maximum value.

Figure 8:
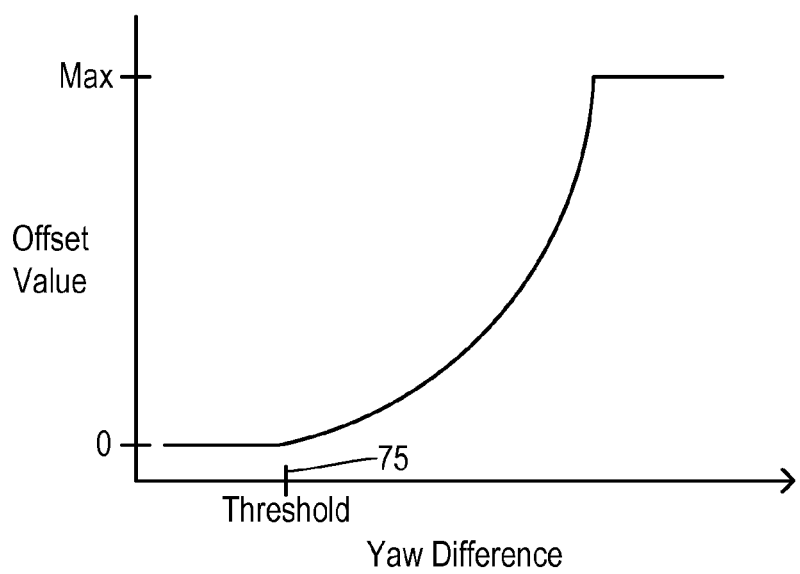
FIG. 8 shows a relationship between a threshold offset and a difference between an actual yaw change and an expected yaw change during a steering maneuver.

FIG. 8 shows another example of a transfer function wherein a yaw difference is used to generate an offset value which has a zero value below a yaw threshold 75 and then monotonically increases to a maximum value.

By basing the time-to-impact threshold employed by the driver assistance system on actual vehicle driving conditions and vehicle usage, the present invention ensures that a driver is alerted in time to react to a potential collision and is better able to avoid the potential collision.

What is claimed is:
1. Apparatus for a vehicle comprising:
  a driver assistance system monitoring approaching objects around the vehicle and configured to take a driver assistance action in response to a predicted impact with an approaching object according to a time-to-impact threshold;

a load monitor detecting whether a trailer is being towed by the vehicle and determining a first offset in response to a result of the detection, wherein the first offset is substantially equal to zero if no trailer is detected;

a braking monitor detecting a braking intensity and a resulting change related to vehicle speed, determining an expected change related to vehicle speed in response to the braking intensity, and selecting a second offset in response to a braking difference between the resulting speed change to the expected speed change, wherein the second offset is substantially equal to zero if the braking difference is below a braking threshold;

a steering monitor detecting a steering angle of the vehicle and a resulting change related to vehicle yaw, determining an expected change in vehicle yaw in response to the steering angle, and selecting a third offset in response to a steering difference between the resulting yaw change to the expected yaw change, wherein the third offset is substantially equal to zero if the steering difference is below a steering threshold;

an updater determining a magnitude of the time-to-impact threshold in response to the first, second, and third offsets.

2. The apparatus of claim 1 wherein the updater determines the magnitude of the time-to-impact threshold according to a sum of a nominal threshold value for the vehicle and the first, second, and third offsets.

3. The apparatus of claim 1 further comprising:
a traction monitor detecting a disparity between a driven-wheel speed and an undriven-wheel speed, determining a torque being applied to the driven-wheel, determining an expected disparity in response to the determined torque, and selecting a fourth offset in response to a difference between the detected disparity and the expected disparity, wherein the fourth offset is substantially equal to zero if the difference between the detected disparity and the expected disparity is below a threshold;
wherein the updater determines the magnitude of the time-to-impact threshold in response to the first, second, third, and fourth offsets.

4. The apparatus of claim 1 wherein the driver assistance system includes a forward-collision warning system, and wherein the driver assistance action is comprised of a perceptible warning signal to alert the driver of the predicted impact.

5. The apparatus of claim 1 wherein the driver assistance system includes an adaptive cruise control system, and wherein the driver assistance action is comprised of reducing a commanded speed of the adaptive cruise control system to avoid the predicted impact.

6. The apparatus of claim 1 wherein the driver assistance system includes a brake-steer system, and wherein the driver assistance action is comprised of applying a braking force to avoid the predicted impact.

7. The apparatus of claim 1 wherein the load monitor identifies a trailer class of a detected trailer, and wherein the load monitor includes a trailer table relating the trailer class to a respective value for the first offset.

8. The apparatus of claim 1 wherein the braking monitor includes a first table relating the braking intensity to a respective value for the expected speed change and a second table relating the braking difference to a respective value for the second offset.

9. The apparatus of claim 1 wherein the steering monitor includes a first table relating the steering angle to a respective value for the expected yaw change and a second table relating the steering difference to a respective value for the third offset.

10. A method of adjusting a driver assistance system that monitors approaching objects around a vehicle and is configured to take a driver assistance action in response to a predicted impact with an approaching object according to a time-to-impact threshold, the method comprising the steps of;
detecting whether a trailer is being towed by the vehicle;
determining a first offset in response to a result of the detection, wherein the first offset is substantially equal to zero if no trailer is detected;
detecting a braking intensity and a resulting change related to vehicle speed;
determining an expected change related to vehicle speed in response to the braking intensity;
selecting a second offset in response to a braking difference between the resulting speed change to the expected speed change, wherein the second offset is substantially equal to zero if the braking difference is below a braking threshold;
detecting a steering angle of the vehicle and a resulting change related to vehicle yaw;
determining an expected change in vehicle yaw in response to the steering angle;
selecting a third offset in response to a steering difference between the resulting yaw change to the expected yaw change, wherein the third offset is substantially equal to zero if the steering difference is below a steering threshold;
determining a magnitude of the time-to-impact threshold in response to the first, second, and third offsets.

11. The method of claim 10 wherein the step of determining a magnitude of the time-to-impact threshold includes forming a sum of a nominal threshold value for the vehicle and the first, second, and third offsets.

12. The method of claim 10 further comprising the steps of:
detecting a disparity between a driven-wheel speed and an undriven-wheel speed;
determining a torque being applied to the driven-wheel;
determining an expected disparity in response to the determined torque; and
selecting a fourth offset in response to a difference between the detected disparity and the expected disparity, wherein the fourth offset is substantially equal to zero if the difference between the detected disparity and the expected disparity is below a threshold;
wherein the step of determining a magnitude of the time-to-impact threshold includes forming a sum of a nominal threshold value for the vehicle and the first, second, third, and fourth offsets.

13. The method of claim 10 wherein the driver assistance system includes a forward-collision warning system, the method further comprising the step of:
generating a perceptible warning signal to alert the driver of the predicted impact.

14. The method of claim 10 wherein the driver assistance system includes an adaptive cruise control system, the method further comprising the step of:
reducing a commanded speed of the adaptive cruise control system to avoid the predicted impact.

15. The method of claim 10 wherein the driver assistance system includes a brake-steer system, the method further comprising the step of:
applying a braking force to avoid the predicted impact.

16. The method of claim 10 further comprising the step of:
identifying a trailer class of a detected trailer;

wherein the first offset is determined from a trailer table relating the trailer class to a respective value for the first offset.

17. The method of claim 10 wherein the second offset is determined from a first table relating the braking intensity to a respective value for the expected speed change and a second table relating the braking difference to a respective value for the second offset.

18. The method of claim 10 wherein the third offset is determined from a first table relating the steering angle to a respective value for the expected yaw change and a second table relating the steering difference to a respective value for the third offset.

\* \* \* \* \*